(No Model.)
P. HATHAWAY.
MEDICAL BATTERY.
No. 474,828. Patented May 17, 1892.
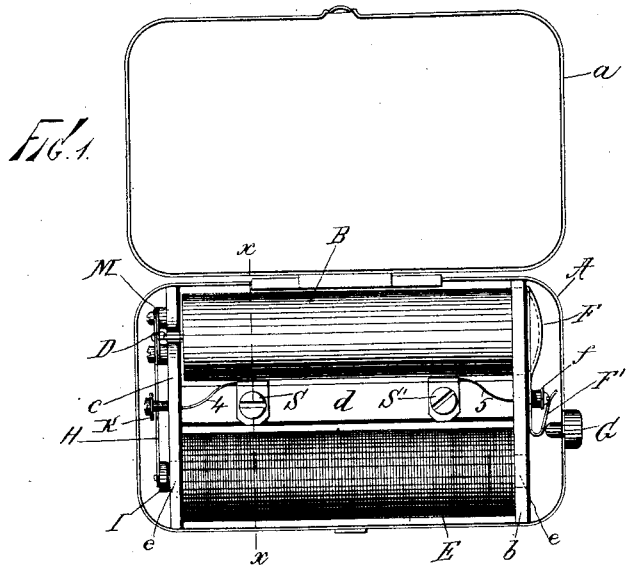
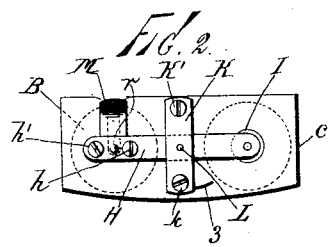
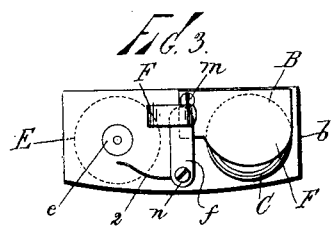
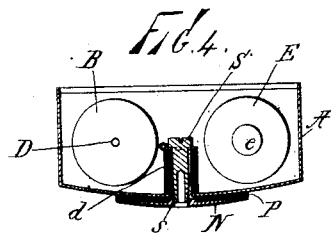
Witnesses:
John Buckler,
Whitefield Sammis
Inventor:
Philip Hathaway
By Redding & Kiddle Attys.

UNITED STATES PATENT OFFICE.

PHILIP HATHAWAY, OF NEW YORK, N. Y.

MEDICAL BATTERY.

SPECIFICATION forming part of Letters Patent No. 474,828, dated May 17, 1892.

Application filed April 2, 1891. Serial No. 387,370. (No model.)

*To all whom it may concern:*

Be it known that I, PHILIP HATHAWAY, of New York city, in the county and State of New York, have invented certain new and useful Improvements in Medical Batteries, of which the following is a specification.

The object of my invention is to produce a battery for use chiefly in electro-therapeutics, which shall be of compact size, portable, and adapted to be applied locally to any part of the body.

My invention is particularly set forth in the following description and the claims forming a part thereof.

In the accompanying drawings, illustrating one embodiment of my invention, Figure 1 is a top view of my battery inclosed in a box, container, or other receptacle in which the parts comprising my battery are placed and held ready for use. Fig. 2 is a view of one end of my battery with the box or container removed. Fig. 3 is a similar view of the opposite end of the battery with the box or container removed, and Fig. 4 is a sectional view taken through line $x\ x$ of Fig. 1.

Referring to the drawings, A is a box or container, of any suitable size and shape, provided with a cover $a$, into which container the parts comprising the battery proper are placed and secured ready for use, as above stated.

B is an electric battery, preferably of the class known as "dry close-seal batteries" and of the character shown and described in another application for Letters Patent filed by me on September 18, 1890, being Serial No. 365,445, which is a chloride-of-silver battery of special construction, comprising a zinc casing C as the positive element or electrode and a chloride-of-silver rod as the negative element or electrode, which is suitably confined within the casing C, from which rod runs a terminal wire D. Although this battery is effectual for the purpose desired, yet I do not limit my invention to the use of this particular battery or class of battery, since any other suitable battery may be employed within the spirit of my invention.

E is an induction-coil, and this induction-coil and the battery B are supported and insulated from each other by a frame, preferably of insulating material, consisting of the uprights or side pieces $b\ c$ and the cross-bar $d$, the induction-coil being held to the frame on one side of the cross-bar $d$ by means of the rod or soft iron $e$, the ends of which rod fitting into openings or bearings in the side pieces $b\ c$. The battery B is similarly supported on the other side of the cross-bar $d$, one end of the battery fitting into an opening in the side piece $b$, providing a bearing therefor, and the side piece $c$ is cut out, as shown in Fig. 2, in which is inserted the terminal wire D, which projects from the other end of the battery B, thus enabling the battery to be readily taken out and another one inserted in its place, as desired.

F is a metal spring-contact plate, which is secured to the side piece $b$ by means of a screw $m$, one end of which plate being made larger than the other end and slightly concaved, as shown in Fig. 3, and into which concavity one end of the battery B fits, making contact therewith, as shown in said figure. The other end of said metal plate F is bent over, as shown in Fig. 1, and is adapted to to make contact with a metal piece $f$, also secured to the side piece $b$ by means of screw $n$, to close the circuit, and this bent end of the plate F, which I designate F', constitutes a spring-contact which normally keeps the electric circuit open and which is operated upon to close the circuit by making contact with the piece $f$ by means of the sliding button G, which is on the outside of the box A, the inner end of which button being adapted to engage with the end F', as shown in Fig. 1, and, as will be understood, this sliding button operates to close the circuit when pushed in one direction and to open the circuit when pushed in the opposite direction. This construction of circuit-closer is a convenient one and adapted to operate successfully on the outside of the container. I do not mean to limit my invention, however, to this particular circuit-closing device, nor to the location of the circuit-closer outside of the container, since there are many other devices for the purpose that may be employed and located either within or without the container, as may be desired, within the spirit of my invention.

H is a vibrator, which is secured to the side piece c, at one end thereof, by the screws h h', which screws also secure to this side piece under the vibrator H a metal spring-contact strip M, between which screws said vibrator and contact-strip are indented, forming a slight recess r, into which the terminal wire D from battery B fits, making contact at that point. At the other end of vibrator H is attached an armature I, which is adapted to be operated by the induction-coil e when in its active condition. K is another metal plate or strip, also secured to the side piece c by screws k k', between which screws is placed a piece of platinum or platinum point L, which is adapted to make contact with a similar piece of platinum or platinum point (not shown) on the vibrator H in the usual manner. Thus, as will be seen, the battery B is maintained in place between two spring-contacts—to wit, the spring-plate F on the upright b and the spring-contact strip M on the upright c, and the circuit is closed by means of the push-button G, as above set forth, and the current travels from the battery B to spring-plate F, spring-contact F', metal piece f, screw n by wire 2 to the induction-coil, which actuates the vibrating armature I, thence to metal vibrator H and strip K, through the platinum points thereon, metal spring-contact strip M, and back to the battery, another wire 3 from the induction-coil being connected with the screw k on the side piece c.

The electrodes by means of which the current generated is taken off by the person using the battery consists of two metal pieces N N, (only one of which being shown in Fig. 4.) They are preferably circular in form, although they may be of any shape, and are preferably affixed to the outside of the box or container on the under side, as shown, being insulated from said box by washers P, of hard rubber or other suitable insulating material, in case the container is made of metal. These electrodes are secured to the box or container by means of the screws S S', which pass through the cross-bar d through openings (not shown) in the bottom of the box and into internally-screw-threaded sockets s s, forming part of the metal electrodes, as shown in Fig. 4, and to these screws run connecting-wires 4 and 5, connecting the electrodes N N with the battery-circuit, as will be understood.

By placing the electrodes on the outside of the box or container and preferably on the under side thereof, as set forth, the battery may be applied locally to any part of the body, but is also adapted to be used in the ordinary manner of employing medical batteries by means of connecting-wires and holders intended to be grasped by the hand. For this purpose the screws S S' are hollowed out and openings or sockets made into and through the electrodes N N and sockets s s thereof, so that pins or other terminals of the connecting cords or wires may be inserted therein, the other ends of said cords or wires being connected with holders or handles in the usual manner, as above set forth.

From the foregoing description the operation of my battery will be clearly understood.

What I claim as my invention, and desire to secure by Letters Patent, is—

1. The combination of a close-sealed electric battery held in position between two spring-contacts, an induction-coil electrically connected with said battery, a vibrator adapted to be actuated by said coil, a container to hold said battery and coil, and two metal electrodes in the circuit affixed to the outside of said container, substantially as set forth.

2. The combination of a close-sealed electric battery held in position between two spring-contacts, an induction-coil electrically connected with said battery, a vibrator adapted to be actuated by said coil, a container to hold said battery and coil, and two metal electrodes affixed to the outside of the container and provided with sockets for the reception of the terminals of conducting cords or wires, substantially as set forth.

3. The combination of a dry close-sealed electric battery held in position between two spring-contacts, an induction-coil electrically connected with said battery, a vibrator adapted to be actuated by said coil, a container to hold said battery and coil, two metal electrodes affixed to the outside of the container and provided with sockets for the reception of the terminals of conducting cords or wires, and a circuit-closing device in the circuit, substantially as set forth.

4. In an electric battery designed for medical purposes, two metal electrodes affixed to the outside of the box or container and provided with sockets for the reception of the terminals of conducting cords or wires, substantially as set forth.

5. The combination, with a close-sealed electric battery the casing of which comprises one electrode and a wire which protrudes from one end thereof comprising the other electrode, of an induction-coil separated from said battery by a frame of insulating material, from which frame both the battery and induction-coil are supported, said battery being held in position between two spring-contacts, a vibrator adapted to be actuated by said induction-coil, all of said parts being securely fastened within a common container, two metal electrodes affixed to the outside of said container and provided with sockets for the reception of the terminals of conducting cords or wires, suitable connecting-wires, and a circuit opening and closing device in the circuit, substantially as set forth.

6. The combination, with a close-sealed electric battery and induction-coil, of a supporting-frame therefor, consisting of side pieces $b\ c$ and cross-bar $d$, the side piece $c$ being cut out, as shown and described, and the side piece $b$ having the spring contact-plate F secured to it, and the screws S S', which pass through the cross-bar $d$, said screws being provided with sockets for the reception of the terminals of conducting cords or wires, substantially as set forth.

This specification signed and witnessed this 30th day of March, 1891.

PHILIP HATHAWAY.

Witnesses:
A. W. KIDDLE,
WHITEFIELD SAMMIS.